(12) United States Patent
Fujimoto

(10) Patent No.: US 11,367,548 B2
(45) Date of Patent: Jun. 21, 2022

(54) E-IRON OXIDE TYPE FERROMAGNETIC POWDER, METHOD FOR MANUFACTURING SAME, AND COMPOSITION CONTAINING E-IRON OXIDE TYPE FERROMAGNETIC POWDER

(71) Applicant: FUJIFILM Corporation, Tokyo (JP)

(72) Inventor: Takashi Fujimoto, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 718 days.

(21) Appl. No.: 15/825,875

(22) Filed: Nov. 29, 2017

(65) Prior Publication Data

US 2018/0151277 A1     May 31, 2018

(30) Foreign Application Priority Data

Nov. 30, 2016    (JP) .............................. JP2016-232884

(51) Int. Cl.

| | | |
|---|---|---|
| *H01F 1/11* | (2006.01) |
| *C08K 3/22* | (2006.01) |
| *C01G 49/06* | (2006.01) |
| *G11B 5/706* | (2006.01) |
| *G11B 5/714* | (2006.01) |
| *H01F 1/113* | (2006.01) |
| *H01F 1/00* | (2006.01) |

(52) U.S. Cl.
CPC ................ *H01F 1/11* (2013.01); *C01G 49/06* (2013.01); *C08K 3/22* (2013.01); *G11B 5/70642* (2013.01); *G11B 5/714* (2013.01); *C01P 2004/64* (2013.01); *C01P 2006/42* (2013.01); *C08K 2003/2268* (2013.01); *C08K 2201/005* (2013.01); *C08K 2201/01* (2013.01); *G11B 5/70615* (2013.01); *H01F 1/0054* (2013.01); *H01F 1/113* (2013.01)

(58) Field of Classification Search
CPC .......... H01F 1/11; H01F 1/0054; H01F 1/113; C08K 2003/2268; C08K 2201/005; C08K 2201/01; C08K 3/22; C01G 49/06; G11B 5/70615; C01P 2004/64; C01P 2006/42
See application file for complete search history.

(56) References Cited

U.S. PATENT DOCUMENTS

| | | | | |
|---|---|---|---|---|
| 5,763,046 A | * | 6/1998 | Ejiri ......................... | G11B 5/70 428/141 |
| 2005/0120918 A1 | | 6/2005 | Iizuka et al. | |
| 2014/0212693 A1 | * | 7/2014 | Hattori ................. | G11B 5/7013 428/832 |

FOREIGN PATENT DOCUMENTS

| | | |
|---|---|---|
| JP | 11-273057 A | 10/1999 |
| JP | 2001-43525 A | 2/2001 |
| JP | 2003-242626 A | 8/2003 |
| JP | 2004-86944 A | 3/2004 |
| JP | 2006-338798 A | 12/2006 |
| JP | 2008-63199 A | 3/2008 |
| JP | 2014-149886 A | 8/2014 |
| JP | 2014-224027 A | 12/2014 |

OTHER PUBLICATIONS

Office Action dated Aug. 6, 2019, issued by the Japanese Patent Office in corresponding Japanese Application No. 2016-232884.
Office Action dated Dec. 15, 2020, issued by the Japanese Patent Office in Japanese application No. 2020-035523.
Office Action dated Jul. 20, 2021, issued by the Japanese Patent Office in JP application No. 2020-035523.

* cited by examiner

*Primary Examiner* — Matthew E. Hoban
*Assistant Examiner* — Lynne Edmondson
(74) *Attorney, Agent, or Firm* — Sughrue Mion, PLLC

(57) ABSTRACT

Provided is an ε-iron oxide type ferromagnetic powder with a powder pH within a range of 4.8 to 6.8; and a method for manufacturing the ε-iron oxide type ferromagnetic powder and a composition containing at least the ε-iron oxide type ferromagnetic powder and a solvent.

15 Claims, No Drawings

E-IRON OXIDE TYPE FERROMAGNETIC POWDER, METHOD FOR MANUFACTURING SAME, AND COMPOSITION CONTAINING E-IRON OXIDE TYPE FERROMAGNETIC POWDER

CROSS-REFERENCE TO RELATED APPLICATIONS

This application claims priority under 35 U.S.C 119 to Japanese Patent Application No. 2016-232884 filed on Nov. 30, 2016. The above application is hereby expressly incorporated by reference, in its entirety.

BACKGROUND OF THE INVENTION

1. Field of the Invention

The present invention relates to an ε-iron oxide type ferromagnetic powder, a method for manufacturing the same, and a composition containing an ε-iron oxide type ferromagnetic powder.

2. Description of the Related Art

Ferromagnetic powders are widely used in various fields. In recent years, among the ferromagnetic powders, an ε-iron oxide type ferromagnetic powder has drawn attention (for example, see JP2014-224027A).

SUMMARY OF THE INVENTION

A composition prepared by mixing a ferromagnetic powder with a solvent and one or more kinds of other optional components can be used for various purposes in various fields. For example, the composition can be used for forming a coating film containing a ferromagnetic powder, and in order to form a coating film having high surface smoothness, it is desirable to inhibit the aggregation of the ferromagnetic powder in the composition. The inhibition of the aggregation of the ferromagnetic powder in the composition is desirable not only for the use such as a coating film but also for maintaining the quality of the composition. However, even though the aggregate of the ferromagnetic powder can be disintegrated in a dispersion treatment for preparing the composition, in a case where the powder is aggregated over time after the dispersion treatment, the composition consequently contains the ferromagnetic powder in an aggregated state. Accordingly, it is desirable that the ferromagnetic powder is hardly aggregated over time in the composition containing a solvent and the like (it is desirable that the ferromagnetic powder exhibits high temporal dispersion stability).

Currently, regarding the ε-iron oxide type ferromagnetic powder, effective means for improving the temporal dispersion stability is not known.

Therefore, an object of the present invention is to provide an ε-iron oxide type ferromagnetic powder that exhibits high temporal dispersion stability.

An aspect of the present invention relates to an ε-iron oxide type ferromagnetic powder (hereinafter, simply described as "ferromagnetic powder" as well) in which a powder pH is within a range of 4.8 to 6.8.

In an aspect, the powder pH of the ferromagnetic powder is within a range of 4.8 to 6.3.

In an aspect, the powder pH of the ferromagnetic powder is within a range of 4.8 to 6.0.

In an aspect, an average particle size of the ferromagnetic powder is within a range of 7.0 to 50.0 nm.

Another aspect of the present invention is a method for manufacturing the ferromagnetic powder, comprising subjecting a precursor of an ε-iron oxide type ferromagnetic material (hereinafter, simply referred to as "precursor" as well) to a coat-forming treatment, converting the precursor into an ε-iron oxide type ferromagnetic material by performing a heat treatment on the precursor having undergone the coat-forming treatment, and subjecting the ε-iron oxide type ferromagnetic material to a coat-removing treatment, in which an ε-iron oxide type ferromagnetic powder obtained after the coat-removing treatment is capable of being further subjected to an acid treatment, and a pH of the manufactured ε-iron oxide type ferromagnetic powder is controlled by adjusting treatment conditions of at least one treatment selected from the group consisting of the coat-forming treatment, the coat-removing treatment, and the acid treatment.

According to an aspect, in the aforementioned manufacturing method, the pH of the manufactured ε-iron oxide type ferromagnetic powder is controlled by adjusting at least the treatment conditions of the coat-forming treatment, the coat-forming treatment is performed by adding a coat-forming agent to a solution containing the precursor of an ε-iron oxide type ferromagnetic material, and the adjusting of the treatment conditions of the coat-forming treatment includes making the pH of a solution, to which the coat-forming agent is added and which contains the precursor of an ε-iron oxide type ferromagnetic material, equal to or lower than 4.0.

In an aspect, the manufacturing method includes performing the acid treatment.

In an aspect, the acid treatment is an acetic acid treatment.

Still another aspect of the present invention relates to a composition comprising at least the ferromagnetic powder and a solvent.

In an aspect, the composition further comprises a binder.

According to an aspect of the present invention, it is possible to improve the temporal dispersion stability of an ε-iron oxide type ferromagnetic powder.

DESCRIPTION OF THE PREFERRED EMBODIMENTS

ε-Iron Oxide Type Ferromagnetic Powder

An aspect of the present invention relates to an ε-iron oxide type ferromagnetic powder in which a powder pH is within a range of 4.8 to 6.8.

The ferromagnetic powder is an ε-iron oxide type ferromagnetic powder. In the present invention and the present specification, the "ε-iron oxide type ferromagnetic powder" refers to a ferromagnetic powder from which an ε-iron oxide type crystal structure is detected as a main phase by X-ray diffractometry. The main phase refers to a structure to which a diffraction peak of the highest intensity is attributed in an X-ray diffraction spectrum obtained by X-ray diffractometry. For example, in a case where a diffraction peak of the highest intensity is attributed to an ε-iron oxide type crystal structure in an X-ray diffraction spectrum obtained by X-ray diffractometry, it is decided that the ε-iron oxide type crystal structure is detected as a main phase. In a case where only a single structure is detected by X-ray diffractometry, the detected structure is regarded as a main phase. For example, even though crystal phases other than an ε-phase, such as an α-iron oxide type crystal structure and a γ-iron oxide type crystal structure, an amorphous phase, and the like are detected by X-ray diffractometry, in a case where the main phase is an ε-iron oxide type crystal structure, the ferromagnetic powder in the present invention and the present specification is regarded as corresponding to an ε-iron oxide type ferromagnetic powder.

Regarding the "ε-iron oxide type ferromagnetic material", except that the form of the ferromagnetic material is not limited to a powder, the above description relating to an ε-iron oxide type ferromagnetic powder is applied.

Furthermore, in the present invention and the present specification, a powder means an aggregate of a plurality of particles. For example, the ε-iron oxide type ferromagnetic powder means an aggregate of a plurality of ε-iron oxide type ferromagnetic particles. The aggregate is not limited to an aspect in which the particles constituting the aggregate directly contact each other, and includes an aspect in which a binder, an additive, and the like which will be described later are interposed between the particles, for example.

Hereinafter, the ferromagnetic powder will be more specifically described.

Powder pH

In the present invention and the present specification, the "powder pH" is a value measured by the following method. Pure water is added to a powder to be measured, in such an amount that a ratio of powder to be measured/water becomes 2/25 (based on mass), and the solution is treated with ultrasonic waves for 1 hours, thereby preparing a dispersion liquid. The prepared dispersion liquid is left to stand for 3 days, and the pH of the supernatant measured thereafter is taken as a powder pH. The above operation is performed in an environment with an atmospheric temperature within a range of 20° C. to 25° C., and liquid temperature control using temperature control means is not performed.

In the present invention and the present specification, "pure water" refers to water having an electric resistivity of equal to or higher than 1 MΩ at a liquid temperature of 25° C.

The powder pH of the ferromagnetic powder is within a range of 4.8 to 6.8. As a result of repeating an intensive examination regarding the improvement of the temporal dispersion stability of an ε-iron oxide type ferromagnetic powder, the inventor of the present invention newly found that the temporal dispersion stability is greatly improved in a case where the powder pH is within a range of 4.8 to 6.8. From the viewpoint of further improving the temporal dispersion stability, the powder pH is preferably equal to or lower than 6.5, more preferably equal to or lower than 6.3, even more preferably equal to or lower than 6.0, still more preferably equal to or lower than 5.9, and yet more preferably equal to or lower than 5.8. From the same viewpoint, the powder pH is preferably equal to or higher than 4.9, and more preferably equal to or higher than 5.0. In an aspect, it is desirable that the dispersibility is easily improved. It can be said that the faster the aggregate can be disintegrated, the easier it is to improve the dispersibility. Here, being easy to improve the dispersibility does not mean high temporal dispersion stability. The ferromagnetic powder exhibiting high temporal dispersion stability does not necessarily easily achieve the improvement of dispersibility, and the ferromagnetic powder which easily achieves the improvement of dispersibility does not necessarily exhibits high temporal dispersion stability. Regarding this point, in an aspect, the aforementioned ferromagnetic powder easily achieves the improvement of dispersibility and can achieve the improvement of the temporal dispersion stability.

The powder pH can be controlled by the treatment conditions of various treatments performed at the time of manufacturing the ferromagnetic powder, and the like. Specific aspects of the control method will be described later.

Average Particle Size

In various fields, it is desirable that the ferromagnetic powder has a small size in many cases. For example, in the field of magnetic recording, from the viewpoint of improving recording density, it is desirable that the ferromagnetic powder contained in a magnetic layer of a magnetic recording medium has a small size. Accordingly, in a case where the temporal dispersion stability of an ε-iron oxide type ferromagnetic powder having a small size can be enhanced, the usefulness of the ε-iron oxide type ferromagnetic powder in various fields can be improved. However, generally, the smaller the size, the easier it is for the powder to be aggregated, and accordingly, the temporal dispersion stability tends to deteriorate. In contrast, according to an aspect of the present invention, it is possible to provide an ε-iron oxide type ferromagnetic powder having a small size and exhibiting high temporal dispersion stability. As a parameter of the size of a powder, the average particle size can be used. The average particle size of the ferromagnetic powder according to an aspect of the present invention is preferably equal to or smaller than 50.0 nm for example, more preferably equal to or smaller than 45.0 nm, even more preferably equal to or smaller than 40.0 nm, still more preferably equal to or smaller than 35.0 nm, yet more preferably equal to or smaller than 30.0 nm, yet even more preferably equal to or smaller than 25.0 nm, and yet still more preferably equal to or smaller than 20.0 nm. From the viewpoint of magnetization stability, the average particle size of the ferromagnetic powder is preferably equal to or greater than 7.0 nm, more preferably equal to or greater than 8.0 nm, even more preferably equal to or greater than 10.0 nm, still more preferably equal to or greater than 11.0 nm, and yet more preferably equal to or greater than 12.0 nm.

In the present invention and the present specification, the average particle size of various powders is a value measured by the following method by using a transmission electron microscope.

By using a transmission electron microscope, the powder is imaged at 80,000× imaging magnification and printed on printing paper such that the total magnification becomes 500,000×, thereby obtaining a photograph of the particles constituting the powder. From the obtained photograph of the particles, a particle of interest is selected, the outline of the particle is traced using a digitizer, and the size of the particle (primary particle) is measured. The primary particle refers to an independent particle that is not aggregated.

Five hundred particles are randomly extracted and measured as described above. The arithmetic mean of the particle sizes of 500 particles obtained in this way is taken as the average particle size of the powder. As the aforementioned transmission electron microscope, for example, it is possible to use a transmission electron microscope H-9000 manufactured by Hitachi, Ltd. Furthermore, for measuring the particle size, it is possible to use known image analysis software such as image analysis software KS-400 manufactured by Carl Zeiss AG. In examples which will be described later, the average particle size is measured using the transmission electron microscope H-9000 manufactured by Hitachi, Ltd as a transmission electron microscope and image analysis software KS-400 manufactured by Carl Zeiss AG as image analysis software.

In the present invention and the present specification, the size of particles (particle size) constituting the powder is represented as below.

(1) In a case where the particles observed in the aforementioned photograph of particles have a needle shape, a spindle shape, a cylindrical shape (here, the height is larger than the maximum major axis of the bottom surface), the particle size is represented by the length of a long axis constituting the particles, that is, a long axis length.

(2) In a case where the particles observed in the aforementioned photograph of particles have a plate shape or a cylindrical shape (here, the thickness of the height is smaller than the maximum major axis of the plate surface or the bottom surface), the particle size is represented by the maximum major axis of the plate surface or the bottom surface.

(3) In a case where the particles observed in the aforementioned photograph of particles have a spherical shape, a polyhedral shape, an amorphous shape, and the like, and the long axis constituting the particles cannot be specified from the shape, the particle size is represented by a circle-equivalent diameter. The circle-equivalent diameter refers to a value determined by a circular projection method.

A preferred manufacturing method for manufacturing the ferromagnetic powder will be described later. Here, as long as the powder pH of the ferromagnetic powder is within a range of 4.8 to 6.8, the manufacturing method thereof is not limited.

The ferromagnetic powder can be used in various fields in which an ε-iron oxide type ferromagnetic powder can be used. For example, in the field of magnetic recording, the ε-iron oxide type ferromagnetic powder according to an aspect of the present invention can be used as a ferromagnetic powder contained in a magnetic layer. Furthermore, in addition to the field of magnetic recording, the ferromagnetic powder can be used in various fields in which an ε-iron oxide type ferromagnetic powder can be used. For example, the ferromagnetic powder can be used for absorbing radio waves. Accordingly, the ε-iron oxide type ferromagnetic powder according to an aspect of the present invention can be used as a radio wave absorber (ferromagnetic powder for absorbing radio waves). In the present invention and the present specification, radio waves refer to electromagnetic waves having a frequency of equal to or shorter than 3,000 GHz. Furthermore, the ferromagnetic powder can also be used in various fields in which an ε-iron oxide type ferromagnetic powder can be used, such as various electronic materials, magnet materials, biomolecule labeling agents, and drug carriers.

Method for Manufacturing ε-Iron Oxide Type Ferromagnetic Powder

An aspect of the present invention relates to a method for manufacturing the ferromagnetic powder according to an aspect of the present invention described above, the method including subjecting a precursor of an ε-iron oxide type ferromagnetic material to a coat-forming treatment (hereinafter, described as "coat-forming step" as well), converting the precursor into an ε-iron oxide type ferromagnetic material by performing a heat treatment on the precursor having undergone the coat-forming treatment (hereinafter, described as "heat treatment step" as well), and subjecting the ε-iron oxide type ferromagnetic material to a coat-removing treatment (hereinafter, described as "coat-removing step" as well), in which an ε-iron oxide type ferromagnetic powder obtained after the coat-removing treatment can be further subjected to an acid treatment, and a pH of the manufactured ε-iron oxide type ferromagnetic powder can be controlled by adjusting treatment conditions of at least one treatment selected from the group consisting of the coat-forming treatment, the coat-removing treatment, and the acid treatment. Hereinafter, the manufacturing method will be more specifically described.

Coat-Forming Step

The precursor of an ε-iron oxide type ferromagnetic material refers to a substance contains an ε-iron oxide type crystal structure as a main phase by heating. The precursor can be an iron-containing hydroxide, an iron-containing oxyhydroxide (oxidized hydroxide), and the like, for example. The method for preparing the precursor is known, and a precursor preparation step in the aforementioned manufacturing method can be performed by a known method. For example, the precursor preparation step can be performed using a coprecipitation method, a reverse micelle method, and the like. For example, regarding the preparation method of the precursor, it is possible to refer to known techniques in paragraphs "0017" to "0021" and examples in JP2008-174405A, paragraphs "0025" to "0046" and examples in WO2016/047559A1, paragraphs "0038" to "0040", "0042", "0044", and "0045" and examples in WO2008/149785A1, and the like.

Incidentally, pure ε-iron oxide is represented by a compositional formula of $Fe_2O_3$, and is constituted with elements iron (Fe) and oxygen (O). The ε-iron oxide type ferromagnetic powder can contain one or more kinds of other elements in addition to Fe and O. The ε-iron oxide type ferromagnetic powder according to an aspect of the present invention may or may not contain such elements. In an aspect, the elements other than Fe and O can substitute Fe in the ε-iron oxide type crystal structure. Specifically, in the ε-iron oxide type crystal structure, the site of Fe can be substituted. For example, provided that an element substituting the site of Fe is denoted by A, the compositional formula of a compound in which a portion of Fe is substituted with the element represented by A in the ε-iron oxide type crystal structure is described as $A_xFe_{(2-x)}O_3$. Herein, A includes one kind of element or two or more kinds of different elements, and $0<x<2$. Examples of A include Ga, Al, In, Rh, Mn, Co, Ni, Zn, Ti, Sn, Nb, V, Ta, Sb, Bi, and the like. In order to obtain an ε-iron oxide type ferromagnetic powder containing the above element, in the precursor preparation step, a portion of a compound that becomes a Fe supply source in ε-iron oxide may be substituted with the compound of the above element. By the amount of the compound substituted, the composition of the obtained ε-iron oxide type ferromagnetic powder can be controlled.

By heating, the iron-containing oxyhydroxide such as iron oxyhydroxide can be converted into a compound having an ε-iron oxide type crystal structure as a main phase. Accordingly, a commercially available iron-containing oxyhydroxide may be used as the precursor, or a compound obtained by subjecting a commercially available iron-containing oxyhydroxide to a treatment such as a grinding treatment may be used as the precursor.

In a case where the precursor is heated after the coat-forming treatment, a reaction can proceeds by which the precursor is converted into an ε-iron oxide type ferromagnetic material under the coat. It is considered that the coat can play a role of preventing the occurrence of sintering at the time of heating. From the viewpoint of ease of forming the coat, the coat-forming treatment is preferably performed in a solution, and more preferably performed by adding a coat-forming agent (compound for forming a coat) to a solution containing the precursor. For example, in a case where the coat-forming treatment is performed in the same solution after the preparation of the precursor, by adding the coat-forming agent to the solution after the preparation of the precursor and stirring the solution, a coat can be formed on the precursor. As the coat, for example, a silicon-containing coat is preferable because the coat is easily formed on the precursor in a solution. Examples of the coat-forming agent for forming the silicon-containing coat include a silane compound such as alkoxysilane. Through the hydrolysis of a silane compound, a silicon-containing coat can be formed on the precursor preferably by using a sol-gel method. Specific examples of the silane compound include tetraethoxysilane (TEOS; tetraethyl orthosilicate), tetramethoxysilane, and various silane coupling agents. Regarding the coat-forming treatment, for example, it is possible to refer to the known techniques in paragraph "0022" and examples in JP2008-174405A, paragraphs "0047" to "0049" and examples in WO2016/047559A1, paragraphs "0041" and "0043" and examples in WO2008/149785A1, and the like. The coat may fully cover the surface of the precursor. Alternatively, a portion of the surface of the precursor may not be covered with the coat.

The powder pH of the ε-iron oxide type ferromagnetic powder can be controlled by adjusting the treatment conditions of various treatments performed at the time of manufacturing and the like. Examples of the treatment conditions adjusted for controlling the pH of the ε-iron oxide type ferromagnetic powder include the type of a component used in a treatment, the amount of a component used, the concentration of a component, the pH of a solution used for performing a treatment, a treatment time, a temperature of a solution used for performing a treatment, an atmospheric temperature at which a treatment is performed, and the like. As an aspect of the treatment conditions, the treatment conditions of the coat-forming treatment can be exemplified. In an aspect in which the coat is formed by adding the coat-forming agent to the precursor-containing solution, as an example of the treatment conditions of the coat-forming treatment, the pH of the precursor-containing solution to which the coat-forming agent is not yet been added. The pH of the solution is a pH measured in an environment with an atmospheric temperature within a range of 20° C. to 25° C., and at the time of measuring the pH, liquid temperature control using temperature control means is not performed. In an aspect, the pH is preferably equal to or lower than 4.0, more preferably equal to or lower than 3.5, and even more preferably equal to or lower than 3.0. The pH of the aforementioned solution can be equal to or higher than 1.0 or 1.5, for example. Here, the powder pH can also be controlled by adjusting one or more other treatment conditions, and accordingly, the pH of the solution is not limited to the aforementioned range. In an aspect, the pH of the solution may be higher than 4.0, for example, or may be equal to or higher than 5.0, 6.0, 7.0, 8.0, 9.0, or 10.0. In an aspect, the pH of the solution can be equal to or lower than 12.0, for example.

The pH of the precursor-containing solution to which the coat-forming agent is not yet been added can be adjusted by any method. For example, in a case where a base is used at the time of preparing the precursor, by adjusting the amount and/or concentration of the base used, the pH of the precursor-containing solution to which the coat-forming agent is not yet been added can be controlled.

Heat Treatment Step

By performing a heat treatment on the precursor having undergone the coat-forming treatment, the precursor can be converted into an ε-iron oxide type ferromagnetic material. The heat treatment can be performed, for example, on the powder (powder of the precursor having the coat) collected from the solution in which the coat-forming treatment is performed. Regarding the heat treatment step, for example, it is possible to refer to the known techniques in paragraph "0023" and examples in JP2008-174405A, paragraph "0050" and examples in WO2016/047559A1, paragraphs "0041" and "0043" and examples in WO2008/149785A1, and the like.

Coat-Removing Step

By performing the heat treatment step, the precursor having the coat is converted into an ε-iron oxide type ferromagnetic material. Because the coat remains on the ε-iron oxide type ferromagnetic material obtained as above, a coat-removing treatment is performed. Regarding the coat-removing treatment, for example, it is possible to refer to the known techniques in paragraph "0025" and examples in JP2008-174405A, paragraph "0053" and examples in WO2008/149785A1, and the like. In an aspect, for controlling the powder pH of the ε-iron oxide type ferromagnetic powder, the treatment conditions of the coat-removing treatment can be adjusted. For example, the coat-removing treatment can be performed in a solution in the presence of a base. Examples of the treatment conditions of the coat-removing treatment include the concentration of a base in the solution in which the coat-removing treatment is performed, the liquid temperature of the solution, and the like. For example, the concentration of the base can be 0.1 to 16.0 mol/L, and the liquid temperature of the solution can be 30° C. to 95° C. Here, because the powder pH can also be controlled by one or more other treatment conditions and the like, the treatment conditions under which the coat-removing treatment is performed are not limited to the aforementioned range.

Acid Treatment

The ε-iron oxide type ferromagnetic powder obtained after the coat-removing treatment can be optionally subjected to an acid treatment. The acid treatment is a treatment for making the ε-iron oxide type ferromagnetic powder coexist with an acid, and preferably performed in a solution. In the present invention and the present specification, "acid" refers to a substance that is defined as an acid by any one or more definitions among the Arrhenius definition, the Bronsted definition, and the Lewis definition (that is, an acid corresponding to one or more acids selected from the group consisting of an Arrhenius acid, a Bronsted acid, and a Lewis acid). In contrast, in the present invention and the present specification, "base" refers to a substance that is defined as a base by one or more definitions among the Arrhenius definition, the Bronsted definition, and the Lewis definition (that is, a base corresponding to one or more bases selected from the group consisting of an Arrhenius base, a Bronsted base, and a Lewis base). In an aspect, in a case where the acid treatment is performed, by adjusting the treatment conditions of the acid treatment, the powder pH of the ε-iron oxide type ferromagnetic powder can be controlled. The acid used in the acid treatment may be an organic acid or an inorganic acid. Examples of the acid used in the acid treatment include acetic acid, phosphoric acid, carbonic acid, oxalic acid, and the like. Among these, acetic acid is preferable. For example, by putting the ε-iron oxide type ferromagnetic powder into an acid solution (for example, an aqueous solution) having a concentration of about 0.1% to 20.0% by mass and performing a treatment for stirring such as an ultrasonic treatment, the acid treatment can be performed.

The ε-iron oxide type ferromagnetic powder having optionally undergone the acid treatment can be optionally subjected to one or more known treatments such as washing, classification, and drying. The ε-iron oxide type ferromagnetic powder obtained in this way have a powder pH within a range of 4.8 to 6.8.

Hitherto, the manufacturing method according to an aspect of the present invention has been described, but the aforementioned manufacturing method is merely an aspect of a manufacturing method for obtaining the ferromagnetic powder according to an aspect of the present invention. As long as an ε-iron oxide type ferromagnetic powder having a powder pH within a range of 4.8 to 6.8 is manufactured, the manufacturing method thereof is not limited, and the ε-iron oxide type ferromagnetic powder is included in the ferromagnetic powder according to an aspect of the present invention. Furthermore, although the coat-removing treatment is performed in the aforementioned manufacturing method, the ferromagnetic powder according to an aspect of the present invention may be manufactured without performing the coat-removing treatment, that is, may be a ferromagnetic powder having a coat. In addition, in the coat-removing treatment, a portion of the coat may remain without being completely removed.

Composition

Another aspect of the present invention relates to a composition containing at least the ε-iron oxide type ferromagnetic powder according to an aspect of the present invention and a solvent.

The composition can be used in various fields for forming a coating film containing the ε-iron oxide type ferromagnetic powder, for example. Furthermore, the composition itself can be used for various purposes. In any case, it is preferable that the ε-iron oxide type ferromagnetic powder in the composition exhibits high temporal dispersion stability.

One kind of solvent may be used singly, or two or more kinds of different solvents may be used by being mixed together. As the solvent, an organic solvent, water, a mixed solvent of an organic solvent and water may be used. Examples of the organic solvent include ketones such as acetone, methyl ethyl ketone, methyl isobutyl ketone, diisobutyl ketone, cyclohexanone, isophorone, and tetrahydrofuran, alcohols such as methanol, ethanol, propanol, butanol, isobutyl alcohol, isopropyl alcohol, and methyl cyclohexanol, esters such as methyl acetate, butyl acetate, isobutyl acetate, isopropyl acetate, ethyl lactate, and glycol acetate, glycol ethers such as glycol dimethyl ether, glycol monoethyl ether, and dioxane, aromatic hydrocarbons such as benzene, toluene, xylene, cresol, and chlorobenzene, chlorinated hydrocarbons such as methylene chloride, ethylene chloride, carbon tetrachloride, chloroform, ethylene chlorohydrin, and dichlorobenzene, N,N-dimethylformamide, hexane, and the like. The solvent may be selected according to the use of the composition, and is not limited to the organic solvents exemplified above. The composition can contain the solvent within a range of 100.0 to 800.0 parts by mass with respect to 100.0 parts by mass of the ferromagnetic powder, for example. The content of the solvent may be determined according to the use of the composition and may be outside the aforementioned range.

The composition contains at least the ferromagnetic powder and the solvent described above, and can optionally further contain one or more kinds of other components. As an example of the components, a binder can be exemplified. As the binder, one or more kinds of resins are used. The resins may be a homopolymer or a copolymer. As the binder, a binder selected from a polyurethane resin, a polyester resin, a polyamide resin, a vinyl chloride resin, an acryl resin obtained by copolymerizing styrene, acrylonitrile, methyl methacrylate, or the like, a cellulose resin such as nitrocellulose, an epoxy resin, a phenoxy resin, a polyvinyl alkyral resin such as polyvinyl acetal or polyvinyl butyral, and the like can be used singly, or a plurality of resins can be used by being mixed together. The binder may be selected according to the use of the composition, and is not limited to the resins exemplified above. The content of the binder in the composition may be determined according to the use of the composition.

The composition can further contain one or more kinds of known additives at any content. The type and content of the additives may be determined according to the use of the composition.

The composition described above can be prepared by mixing the various components described above in any order and performing a known dispersion treatment. In the composition, the ε-iron oxide type ferromagnetic powder according to an aspect of the present invention can exhibit high temporal dispersion stability.

EXAMPLES

Hereinafter, the present invention will be more specifically described using examples, but the present invention is not limited to the aspects shown in the examples. In the following description, "part" and "%" represent "part by mass" and "% by mass" respectively. Unless otherwise specified, the operation described below is performed in the atmosphere at room temperature. The room temperature is 25° C.

Example 1

Preparation of Precursor and Coat-Forming Step

In a state where an aqueous solution, which was obtained by dissolving 6.8 g of iron (III) nitrate nonahydrate in 93 g of pure water, was being stirred using a magnetic stirrer in the atmosphere under the condition of a liquid temperature of 25° C., 3.0 g of a 25% aqueous ammonia solution was added thereto, followed by stirring for 2 hours. After 900 g of pure water was further added to the aqueous solution that was continuously stirred, stirring was stopped, and the aqueous solution was left to stand. By visual observation, it was confirmed that the supernatant and the precipitate were separated from each other. Thereafter, the pH of the solution after being left to stand (pH of a precursor-containing solution to which a coat-forming agent was not yet been added) was measured at room temperature.

Subsequently, the aqueous solution was heated such that the liquid temperature thereof became 50° C., and then 60 mL of tetraethoxysilane (TEOS) as a coat-forming agent was added dropwise thereto, followed by stirring for 24 hours, thereby preparing a reaction solution. The reaction solution was left to stand overnight in a drier with an internal atmospheric temperature of 80° C., and the precipitated powder was recovered. The recovered powder was a powder of precursor having a silicon-containing coat as a hydrolysate of tetraethoxysilane. Presumably, the silicon-containing coat formed herein might be a coat of an oxide of silicon.

Heat Treatment Step

In the atmosphere, the recovered powder was subjected to a heat treatment for 4 hours in a heat treatment furnace with an internal furnace temperature of 1,060° C., thereby obtaining a heat-treated material.

Coat-Removing Step

The obtained heat-treated material was put into a 4 mol/L aqueous sodium hydroxide (NaOH) solution and stirred for 24 hours at a liquid temperature of 70° C., thereby removing the coat of an oxide of silicon from the heat-treated material. By a centrifugation treatment, the powder having undergone the coat-removing treatment was collected and washed with pure water.

Through the aforementioned steps, an ε-iron oxide type ferromagnetic powder was obtained. By X-ray diffractometry, it was confirmed that the obtained powder is an ε-iron oxide type ferromagnetic powder. The X-ray diffractometry was performed by scanning the powder by using CuKα radiation under the conditions of a voltage of 45 kV and an intensity of 40 mA and measuring the X-ray diffraction pattern under the following conditions. As a result of the X-ray diffractometry, only an ε-iron oxide type crystal structure was detected.

PANalytical X'Pert Pro diffractometer, PIXcel detector
Soller slit of incidence beam and diffraction beam: 0.017 radians
Fixed angle of dispersion slit: ¼°
Mask: 10 mm
Anti-scatter slit: ¼°
Measurement mode: continuous
Measurement time for each stage: 3 seconds
Measurement rate: 0.017°/sec
Measurement step: 0.05°

Example 2

An ε-Iron oxide type ferromagnetic powder was obtained by the same method as in Example 1, except that the amount of the 25% aqueous ammonia solution added was changed to 2.5 g.

Example 3

An ε-Iron oxide type ferromagnetic powder was obtained by the same method as in Example 1, except that the amount of the 25% aqueous ammonia solution added was changed to 4.0 g.

Example 4

An ε-Iron oxide type ferromagnetic powder was obtained by the same method as in Example 1, except that the amount of the 25% aqueous ammonia solution added was changed to 4.5 g.

Example 5

An ε-Iron oxide type ferromagnetic powder was obtained by the same method as in Example 1, except that the amount of the 25% aqueous ammonia solution added was changed to 4.8 g.

Comparative Example 1

In the method described in examples in JP2014-224027A, it was revealed that the powder pH of the obtained ε-iron oxide type ferromagnetic powder is not within the range of 4.8 to 6.8. Therefore, by the following method based on the method described in paragraph "0028" in JP2014-224027A, an ε-iron oxide type ferromagnetic powder was prepared.

A solution, which was obtained by adding 8.0 g of sol of iron (III) oxyhydroxide particles (β-FeO(OH)) having an average particle size of about 6 nm and 17.3 g of a 25% aqueous ammonia solution to 420 g of pure water, was stirred using a magnetic stirrer, the stirring was then stopped, and the solution was left to stand. By visual observation, it was confirmed that the supernatant and the precipitate were separated from each other. Then, the pH of the solution after being left to stand (pH of a precursor-containing solution to which a coat-forming agent was not yet been added) was measured at room temperature.

Subsequently, the solution was stirred for 40 minutes at a liquid temperature of 50° C. In a state where the solution was being continuously stirred, 24 mL of tetraethoxysilane (TEOS) as a coat-forming agent was added dropwise thereto, followed by stirring for 24 hours. The solution was left to cool to room temperature, and 20 g of ammonium sulfate was then added thereto such that a precipitate was precipitated. The precipitate was collected by a centrifugation treatment and washed with pure water. The precipitate was dried in a drier with an internal atmospheric temperature of 80° C., and after drying, a powder was recovered. The recovered powder was a powder of a precursor having a silicon-containing coat as a hydrolysate of tetraethoxysilane.

Then, by performing the heat treatment step and the coat-removing step by the same method as in Example 1, an ε-iron oxide type ferromagnetic powder was obtained.

Example 6

An ε-Iron oxide type ferromagnetic powder was obtained by the same method as in Comparative Example 1. The obtained powder was put into a 15% aqueous acetic acid solution and treated with ultrasonic waves for 30 minutes, and then the solution was stirred for 5 hours at a liquid temperature of 50° C. by using a magnetic stirrer. After the stirring is finished, the powder was collected by a centrifugation treatment and washed with pure water, thereby obtaining an ε-iron oxide type ferromagnetic powder having undergone an acetic acid treatment.

Example 7

An ε-Iron oxide type ferromagnetic powder was obtained by the same method as in Example 1. The obtained powder was subjected to an acetic acid treatment by the same method as in Example 6, thereby obtaining an ε-iron oxide type ferromagnetic powder treated with acetic acid.

Example 8

The coat-removing step was performed by the following method, and other steps were performed by the same method as in Example 1, thereby obtaining an ε-iron oxide type ferromagnetic powder.

The heat-treated material obtained after the heat treatment step was put into a 1 mol/L aqueous sodium hydroxide (NaOH) solution and stirred for 24 hours at a liquid temperature of 90° C., thereby removing the coat of an oxide of silicon from the heat-treated material. The powder from which the coat had been removed was collected by a centrifugation treatment and washed with pure water.

Example 9

Until the heat treatment step, the same method as in Example 1 was performed. Then, the coat-removing step was performed by the same method as in Example 8.

Thereafter, an acetic acid treatment was performed by the same method as in Example 6, thereby obtaining an ε-iron oxide type ferromagnetic powder having undergone an acetic acid treatment.

Comparative Example 2

Until the heat treatment step, the same method as in Example 1 was performed, except that the amount of the 25% aqueous ammonia solution added was changed to 2.0 g. Then, the coat-removing step was performed by the method described below.

The heat-treated material obtained after the heat treatment step was put into a 0.8 mol/L aqueous sodium hydroxide (NaOH) solution and stirred for 24 hours at a liquid temperature of 95° C., thereby removing the coat of an oxide of silicon from the heat-treated material.

Then, an acetic acid treatment was performed by the same method as in Example 6, thereby obtaining an ε-iron oxide type ferromagnetic powder having undergone an acetic acid treatment.

Comparative Example 3

In the manufacturing method using a reverse micelle method performed in the related art, it was revealed that the powder pH of the obtained ε-iron oxide type ferromagnetic powder is not within the range of 4.8 to 6.8. Therefore, by the following method, an ε-iron oxide type ferromagnetic powder was prepared.

24 g of pure water, 73 mL of n-octanone, and 15 mL of 1-butanol were uniformly mixed together, thereby preparing a mixed solvent. 4.8 g of iron (III) nitrate nonahydrate and 1.2 g of gallium (III) nitrate octahydrate were added to the prepared mixed solvent and dissolved by being stirred using a magnetic stirrer at room temperature, thereby obtaining a solution. Cetyltrimethylammonium bromide as a surfactant was added to the obtained solution, in an amount by which a molar ratio of pure water/surfactant became 30, followed by dissolution by stirring, thereby obtaining a micelle solution I.

In another container, 8 mL of a 25% aqueous ammonia solution and 16 mL of pure water were mixed and stirred together, and 73 mL of n-octanone and 15 mL of 1-butanol were further added thereto, followed by stirring. As a surfactant, cetyltrimethylammonium bromide was added to the solution obtained by stirring, in an amount by which a molar ratio of (pure water+moisture in aqueous ammonia solution)/surfactant became 30, followed by dissolution, thereby obtaining a micelle solution II.

While the micelle solution I was being stirred, the micelle solution II was added dropwise thereto. After the dropwise addition was finished, stirring was continued for 30 minutes and then stopped, and the solution was left to stand. By visual observation, it was confirmed that the supernatant and the precipitate were separated from each other. Then, the pH of the solution after being left to stand (pH of a precursor-containing solution to which a coat-forming agent was not yet been added) was measured at room temperature.

Thereafter, as a coat-forming agent, 5 mL of tetraethoxysilane (TEOS) was added dropwise to the solution, followed by stirring for 24 hours. By performing a centrifugation treatment on the solution having undergone stirring, a precipitate was collected, and the precipitate was washed with pure water. The precipitate having undergone washing was dried in a drier with an internal atmospheric temperature of 80° C., and a powder having undergone drying was recovered. The recovered powder was a powder of a precursor having the silicon-containing coat as a hydrolysate of tetraethoxysilane.

Then the heat treatment step and the coat-removing step were performed by the same method as in Example 1, except that the internal furnace temperature in the heat treatment step was changed to 1,000° C., thereby obtaining an ε-iron oxide type ferromagnetic powder.

On each of the ferromagnetic powders obtained in Examples 2 to 9 and Comparative Examples 1 to 3, X-ray diffractometry was performed in the same manner as in Example 1. As a result, only an ε-iron oxide type crystal structure was detected.

Method for Evaluating Ferromagnetic Powder

1. Measurement of Average Particle Size

The average particle size of each of the ferromagnetic powders obtained in Examples 1 to 9 and Comparative Examples 1 to 3 was measured by the method described above.

2. Measurement of Powder pH 5 g of water was added to 400 mg of each of the ferromagnetic powders obtained in Examples 1 to 9 and Comparative Examples 1 to 3, and the powder pH was measured by the method described above.

3. Temporal Dispersion Stability

The temporal dispersion stability of each of the ferromagnetic powders obtained in Examples 1 to 9 and Comparative Examples 1 to 3 was evaluated by the following method.

1.00 part of the ferromagnetic powder was suspended in a solution including 0.14 parts of a binder (polyester polyurethane), 1.60 parts of methyl ethyl ketone (2-butanone), and 1.10 parts of cyclohexanone, thereby obtaining a suspension.

10.00 parts of zirconia beads having a bead size of 0.1 mm were added to the suspension, and in a state where a dispersion treatment was being performed on the suspension by an ultrasonic treatment, sampling was occasionally performed whenever a certain period of time passed, thereby collecting a portion of the dispersion liquid. The average particle diameter (dispersion particle size) in the collected dispersion liquid was measured using a dynamic light scattering-type particle size distribution analyzer LB-500 manufactured by HORIBA, Ltd. At a point in time when the dispersion particle size became equal to or smaller than 20 nm, the dispersion treatment was finished, and the dispersion liquid was left to stand. In a state where the dispersion liquid was being left to stand, sampling was occasionally performed whenever a certain period of time passed, and the dispersion particle size was measured using the dynamic light scattering-type particle size distribution analyzer LB-500 manufactured by HORIBA, Ltd. The time taken for the scattering intensity of an aggregate, which had a dispersion particle size of equal to or greater than 100 nm, to be equal to or higher than 0.5 times the scattering intensity of the primary particle size was measured. Table 1 shows the time as a time taken for an aggregate to occur. As the time taken for an aggregate to occur is increased, it is possible to determine that the ferromagnetic powder has higher temporal dispersion stability.

4. Ease of Improving Dispersibility

Table 1 shows, as a dispersion time, the time taken for the dispersion particle size to become equal to or smaller than 20 nm from the beginning of the dispersion treatment in the section 3. As the dispersion time is reduced, it is possible to determine that the dispersibility can be more easily improved.

TABLE 1

|  | pH of precursor-containing solution to which coat-forming agent is not yet been added | NaOH concentration and liquid temperature at the time of coat-removing treatment | Whether or not acid treatment was performed | Average particle size (nm) | Powder pH | Temporal dispersion stability Time taken for aggregate to occur (hr) | Ease of improving dispersibility Dispersion time (hr) |
|---|---|---|---|---|---|---|---|
| Example 1 | 2.4 | 4 mol/L, 70° C. | Not performed | 13.9 | 6.0 | 20.0 | 2.0 |
| Example 2 | 2.2 | 4 mol/L, 70° C. | Not performed | 14.1 | 5.9 | 20.0 | 2.0 |
| Example 3 | 2.8 | 4 mol/L, 70° C. | Not performed | 13.8 | 6.3 | 20.0 | 2.2 |
| Example 4 | 3.2 | 4 mol/L, 70° C. | Not performed | 13.9 | 6.6 | 18.0 | 3.0 |
| Example 5 | 3.4 | 4 mol/L, 70° C. | Not performed | 14.2 | 6.8 | 18.0 | 3.0 |
| Comparative Example 1 | 11.8 | 4 mol/L, 70° C. | Not performed | 14.1 | 7.1 | 2.0 | 3.5 |
| Example 6 | 11.8 | 4 mol/L, 70° C. | Performed | 14.1 | 5.9 | 22.0 | 1.6 |
| Example 7 | 2.4 | 4 mol/L, 70° C. | Performed | 13.9 | 5.1 | 24.0 | 1.5 |
| Example 8 | 2.4 | 1 mol/L, 90° C. | Not performed | 13.9 | 5.6 | 24.0 | 1.5 |
| Example 9 | 2.4 | 1 mol/L, 90° C. | Performed | 13.9 | 4.9 | 22.0 | 1.6 |
| Comparative Example 2 | 1.8 | 0.8 mol/L, 95° C. | Performed | 13.8 | 4.7 | 8.0 | 1.7 |
| Comparative Example 3 | 10.2 | 4 mol/L, 70° C. | Not performed | 14.0 | 6.9 | 1.5 | 3.3 |

From the results shown in Table 1, it is possible to confirm that the ε-iron oxide type ferromagnetic powder of the examples exhibit temporal dispersion stability that is much higher than that of an ε-iron oxide type ferromagnetic powder of the comparative examples. Furthermore, from the dispersion time shown in Table 1, it is possible to confirm that the ε-iron oxide type ferromagnetic powder of the examples easily achieves the improvement of dispersibility.

The present invention is useful in various technical fields in which an ε-iron oxide type ferromagnetic powder can be used.

What is claimed is:

1. An ε-iron oxide ferromagnetic powder, said powder being a ferromagnetic powder from which an ε-iron oxide crystal structure is detected as the main phase by X-ray diffractometry,
wherein the powder pH is within a range of 4.9 to 6.8,
and the powder pH is measured by adding pure water to a powder to be measured in such an amount that the mass ratio of powder to be measured/water becomes 2/25, treating the powder/water mixture with ultrasonic waves for 1 hour thereby preparing a dispersion liquid, leaving the prepared dispersion liquid to stand for 3 days, and measuring the pH of a resulting supernatant liquid, said pH being taken as the powder pH.

2. The ε-iron oxide ferromagnetic powder according to claim 1,
wherein the powder pH is within a range of 4.9 to 6.3.

3. The ε-iron oxide ferromagnetic powder according to claim 1,
wherein the powder pH is within a range of 4.9 to 6.0.

4. The ε-iron oxide ferromagnetic powder according to claim 1,
wherein the average particle size is within a range of 7.0 to 50.0 nm.

5. The ε-iron oxide ferromagnetic powder according to claim 2,
wherein the average particle size is within a range of 7.0 to 50.0 nm.

6. The ε-iron oxide ferromagnetic powder according to claim 3,
wherein the average particle size is within a range of 7.0 to 50.0 nm.

7. A method for manufacturing an ε-iron oxide ferromagnetic powder,
wherein the ε-iron oxide ferromagnetic powder is an ε-iron oxide ferromagnetic powder from which an ε-iron oxide crystal structure is detected as the main phase by X-ray diffractometry, wherein the powder pH of the ε-iron oxide ferromagnetic powder is within a range of 4.8 to 6.8, and
the method comprises:
subjecting a precursor of an ε-iron oxide ferromagnetic material to a coat-forming treatment;
converting the precursor into an ε-iron oxide ferromagnetic material by performing a heat treatment on the precursor having undergone the coat-forming treatment; and
subjecting the ε-iron oxide ferromagnetic material to a coat-removing treatment,
wherein an ε-iron oxide ferromagnetic powder obtained after the coat-removing treatment is further subjected to an acetic acid treatment, and
the pH of the manufactured ε-iron oxide ferromagnetic powder is controlled by adjusting treatment conditions of at least one treatment selected from the group consisting of the coat-forming treatment, the coat-removing treatment, and the acetic acid treatment.

8. The manufacturing method according to claim 7,
wherein the pH of the manufactured ε-iron oxide ferromagnetic powder is controlled by adjusting at least the treatment conditions of the coat-forming treatment,
the coat-forming treatment is performed by adding a coat-forming agent to a solution containing the precursor of an ε-iron oxide ferromagnetic material, and
the adjusting of the treatment conditions of the coat-forming treatment includes making the pH of a solution, to which the coat-forming agent is added and which contains the precursor of an ε-iron oxide ferromagnetic material, equal to or lower than 4.0.

9. A composition,
which comprises at least an ε-iron oxide ferromagnetic powder and a solvent,
wherein the ε-iron oxide ferromagnetic powder is an ε-iron oxide ferromagnetic powder from which an ε-iron oxide crystal structure is detected as the main phase by X-ray diffractometry, wherein the powder pH of the ε-iron oxide ferromagnetic powder is within a range of 4.9 to 6.8,
and the powder pH is measured by adding pure water to a powder to be measured in such an amount that the mass ratio of powder to be measured/water becomes 2/25, treating the powder/water mixture with ultrasonic waves for 1 hour thereby preparing a dispersion liquid, leaving the prepared dispersion liquid to stand for 3 days, and measuring the pH of a resulting supernatant liquid, said pH being taken as the powder pH.

10. The composition according to claim 9, wherein the powder pH is within a range of 4.9 to 6.3.

11. The composition according to claim 9, wherein the powder pH is within a range of 4.9 to 6.0.

12. The composition according to claim 9, wherein the average particle size of the ε-iron oxide ferromagnetic powder is within a range of 7.0 to 50.0 nm.

13. The composition according to claim 10, wherein the average particle size of the ε-iron oxide ferromagnetic powder is within a range of 7.0 to 50.0 nm.

14. The composition according to claim 11, wherein the average particle size of the ε-iron oxide ferromagnetic powder is within a range of 7.0 to 50.0 nm.

15. The composition according to claim 9, further comprising:

a binder.

* * * * *